(12) United States Patent
Miller et al.

(10) Patent No.: US 6,478,998 B1
(45) Date of Patent: Nov. 12, 2002

(54) HYBRID PHENOL-FORMALDEHYDE AND POLYMERIC ISOCYANATE BASED ADHESIVE AND METHODS OF SYNTHESIS AND USE

(75) Inventors: Todd R. Miller, Eugene, OR (US); Lewis D. Creel, Dexter, OR (US); William D. Detlefsen, Springfield, OR (US)

(73) Assignee: Borden Chemical, Inc., Columbus, OH (US)

( * ) Notice: Subject to any disclaimer, the term of this patent is extended or adjusted under 35 U.S.C. 154(b) by 0 days.

(21) Appl. No.: 09/661,458

(22) Filed: Sep. 13, 2000

(51) Int. Cl.⁷ .............................. C08L 61/10; B27N 3/10
(52) U.S. Cl. .................. 264/109; 264/122; 524/35; 525/452; 525/456; 525/504
(58) Field of Search .................. 525/504, 456, 525/452; 524/35; 264/109, 122

(56) References Cited

U.S. PATENT DOCUMENTS

| | | |
|---|---|---|
| 4,148,777 A | 4/1979 | LaBar et al. |
| 4,157,324 A | 6/1979 | Culbertson |
| 4,247,417 A | 1/1981 | Edinger |
| 4,257,995 A | 3/1981 | McLaughlin et al. |
| 4,257,996 A | 3/1981 | Farrissey, Jr. |
| 4,336,179 A | 6/1982 | Iyer |
| 4,376,088 A | 3/1983 | Prather |
| 4,403,066 A | 9/1983 | Brode et al. |
| 4,496,684 A | 1/1985 | O'Connor et al. |
| 4,522,975 A | 6/1985 | O'Connor et al. |
| 4,546,124 A | 10/1985 | Laitar et al. |
| 4,578,448 A | 3/1986 | Brode et al. |
| 4,634,758 A | 1/1987 | Laitar et al. |
| 4,644,022 A | 2/1987 | Iyer |
| 4,902,727 A | 2/1990 | Aoki et al. |
| 4,961,795 A | 10/1990 | Detlefsen et al. |
| 4,994,505 A | 2/1991 | Gerber |
| 5,043,412 A | 8/1991 | Chandramouli et al. |
| 5,051,454 A | 9/1991 | Lemon et al. |
| 5,189,079 A | 2/1993 | Geoffrey et al. |
| 5,264,535 A | 11/1993 | Geoffrey et al. |
| 5,340,888 A | 8/1994 | Lemon et al. |
| 5,677,414 A * | 10/1997 | Spaltenstein ................ 528/129 |
| 5,681,612 A | 10/1997 | Benedict et al. |
| 6,214,265 B1 * | 4/2001 | Rosthauser ................ 264/109 |

* cited by examiner

Primary Examiner—Patricia A. Short
(74) Attorney, Agent, or Firm—Stevens, Davis, Miller & Mosher, L.L.P.

(57) ABSTRACT

Hybrid resins formed of an acylated phenol-formaldehyde (PF) resin and a polymeric phenyl isocyanate (pMDI) resin have extended shelf stability, yet cure at a rate faster than any of its components when used in conventional flakeboard, strandboard or other board making processes.

26 Claims, No Drawings

HYBRID PHENOL-FORMALDEHYDE AND POLYMERIC ISOCYANATE BASED ADHESIVE AND METHODS OF SYNTHESIS AND USE

BACKGROUND OF THE INVENTION

1. Field of the Invention

This invention relates generally to the field of adhesives, more particularly to adhesives useful in the area of forest products, such as plywood, chipboard, waferboard, strandboard, etc. Methods of synthesis, the resulting adhesive and methods of using the adhesive are within the scope of the invention.

2. Description of the Related Art

Forest products, especially products which are manufactured into useful materials through the use of adhesives are generally known. Chipboard, waferboard, strandboard, plywood and other composites made through the addition of an adhesive to forest products or byproducts is well established. Generally, the adhesive comprises a phenol-formaldehyde (PF) resin. Another commonly used resin is a liquid polymeric 4,4'-methylene-bis(phenyl isocyanate) (pMDI). Although aqueous, alkaline phenol-formaldehyde resins show good durability, relatively low cost and relatively low toxicity, they are known to exhibit slower press times and, in general, produce products with higher thickness swell properties than the same products composed of a pMDI binder. Although isocyanate resins can exhibit some enhanced performance, they are more costly than PF resins.

An additional drawback to production in manufacturing plants is the huge capital costs associated with the press and associated equipment, including steam generation equipment which provides the heat during the pressing process. Yet the press itself is a bottleneck in the process because of the dwell time of the product required in the press in order to cure the adhesive. Thus, any manner of reducing dwell time would be of commercial importance to the board making industry.

Thus, there exists a need for suitable adhesive compositions for the manufacture of improved wood products, especially exterior grade products, such as waferboard and oriented strandboard.

SUMMARY OF THE INVENTION

It is, therefore, an object of the invention to provide novel adhesive systems which avoid the problems associated with the known adhesives.

It is a further object of the invention to provide a hybrid resin comprising the combination of a PF resin and pMDI that forms a single phase liquid material, and which has both shelf stability, and fast cure times when used in conventional board making processes.

We have found that by combining a protected PF resin and pMDI we can obtain a storage life of greater than 2 weeks at room temperature.

The hybrid resin of the invention can be applied to forest products by applying, e.g., by spraying, blending or otherwise mixing the adhesive and lignocelluosic material, such as wood flakes, wood fibers, wood particles, wood wafers, strips or strands, or other comminuted lignocellulosic materials while the materials are tumbled or agitated in a blender or similar apparatus. Once blended, the materials are formed into a loose mat which, optionally after orientation of the lignocellulosic materials, is compressed between heated platens or plates to set the binder and bond the flakes, strands, strips, pieces, etc. together in densified form.

Conventional processes are carried out at elevated temperatures of from about 120 to 225° C., by using a source of heat, such as steam, to heat the platens, or even to inject the steam into the mat, to cure the resin.

Alternatively, the blended material may be fed to molds for the purpose of forming molded articles in which the resin and particles are bonded under heat and pressure. However, notwithstanding the particular shaping process employed, the resin of the invention has a faster cure time than any of its components.

The adhesive of the invention has other utilities, such as being coated upon veneers or strips of wood, laminates, etc. by roll coating, knife coating, curtain coating or spraying the adhesive onto the veneer surface(s). A plurality of veneers are then laid-up to form sheets of the required thickness and subjected to heat and pressure to effect consolidation and curing of the materials into a board.

Synthesis of the novel adhesives of the invention are also disclosed in more detail in connection with the description of the preferred embodiments.

DETAILED DESCRIPTION OF THE PREFERRED EMBODIMENTS

Phenol-formaldehyde resins are generally well known to fall into two classes depending upon the phenol to formaldehyde ratio and being generally termed "novolacs" or "novolaks" (which are thermoplastic) and "resoles" (which are thermosetting).

On the other hand, pMDI resins used to bond cellulosic materials are also reported in the prior art; See, U.S. Pat. Nos. 3,666,953; 5,008,359; 5,140,086; 5,143,768; and 5,204,176, the entire disclosures of which are herein incorporated by reference.

To mediate the undesirable properties of PF and pMDI, the inventors thought to combine the two resin systems. However, the physical combination of the two binders is problematic because of differences in polarity and incompatible chemical functional groups. A strategy to produce a hybrid resin by emulsification of the pMDI in PF resin and chemical modification of the NCO functional group of the pMDI proved not to give a satisfactory combination of storage life and performance. Thus, the inventors conceived of the invention by modifying the PF resin.

The inventors protected the functional group of the PF resin, e.g., by acylating the PF resin, and found that the esterfication of the phenolic oxygen greatly diminished the reactivity of the PF portion of the mixture when combined with pMDI to form a single phase liquid material with a storage life of greater than 2 weeks at room temperature.

The diminished reactivity of the PF portion is well illustrated by its gel time in excess of 350 hours at 125° C. The gel time of the pMDI alone, or with added water to mimic the conditions needed to cure the hybrid resin is in excess of 100 min. at 121° C. However the gel time with added water of the acylated PF/pMDI system is about 10 min.

The acyl PF resin can be produced by any known method of hydroxyl group acylation, to yield an organic-soluble anhydrous clear liquid. The acylated PF resin can than be added to any commercially available pMDI resin, or a pMDI resin synthesized to customer's specifications.

When the acyl group is a carboxylic ester, it acts as a protecting group that permits reactivity of the hydroxyl oxygens with the NCO functionality of the pMDI resin. Under conditions of temperature and moisture encountered during manufacture of boards, such as strandboard, the PF portion is deprotected and the PF and pMDI can react with one another.

There is a wide combination of phenolic resins and acyl groups that can be employed to render the PF resin inactive toward reaction with isocyanate groups as disclosed in U.S. Pat. Nos. 5,051,454 and 5,340,888, the entire disclosures of which are herein incorporated by reference.

Suitable acyl groups include acetate, such as acetoacetate, and groups such as ketene and diketene groups may be used to form the acyl protecting groups. Additionally, groups such as formate, acrylate, propionate, lactate, crotonate, methacrylate, butyrate, isobutyrate, caproate, caprylate, benzoate, toluate, p-amino-benzoate, p-hydroxybenzoate, salicylate, cinnamate, laurate, myristate, palmitate, oleate, ricinoleate, stearate, oxalate, euccinate, fumarate, maleate, adipate, phthalate, azelate and sebacate may be used to form acyl protecting groups in accordance with the invention.

Because of the inherent protecting nature of the acyl groups, the acyl PF resin can be used in combination with any pMDI resin that is useful in commercial panel production.

We have found that the two resins may be combined in amounts of from 10–80 wt % PF resin based on the weight of the whole system. However, we have also found that hybrid resins comprised of 10–35 wt % PF exhibit better lack of viscosity advancement over a period of four weeks. With the addition of water in acetone, a 30 wt % PF/pMDI hybrid resin will react at 121° C. to form a gel, which hardens to form a single phase material. We have also found that strandboard panels produced with a 40 wt % PF/60 wt % pMDI hybrid resin exhibit cure speeds that appear much faster than either of its two components above. This synergistic effect was not expected by us.

The advantages of the invention will become apparent by reference to the following examples:

EXAMPLE 1

Phenyl acetate and aniline were combined in a reaction vessel in approximately equimolar amounts. The temperature was raised to 121° C. for 5 minutes to simulate the interior of a strandboard panel during hot pressing. Acetanilide, the product of actuation by aniline was identified as a major reaction product demonstrating that, under these conditions, the PF portion would be deprotected and, therefore, activated toward condensation and reaction with NCO.

EXAMPLE 2

An acetylated PF resin prepared from the treatment of a commercially available PF resin (sold under the description AcmeFlow®2012) with acetyl chloride and triethylamine was combined with a commercial pMDI resin (sold under the description MondurMR® from Bayer Co.). Combinations in the weight ratios of 10%, 25% and 33% acyl PF produced clear homogeneous solutions that did not advance in viscosity noticeably over the test period of two weeks.

EXAMPLE 3

A mixture of 30 wt % PF/pMDI with 0.25 mol. eq. of water/NCO was heated at 121° C. Samples were collected after 5 min. and 8 min. at which point the mixture was a soft gelatinous material was removed from the heat source and after 2–3 minutes, the sample appeared to be single phase hard solid. This example is consistent with the co-reactivity of the two resins.

EXAMPLE 4

A resin composition of 40 wt % acyl PF/60 wt % pMDI with an intrinsic viscosity of 75 cps at 25° and 300 cps at 40° C. was applied to wood particles using the standard procedure for making composite panels. The following resins were compared to determine how the performance of the hybrid resin compared to that of a commercially available pMDI (MondurMR®) resin.

| Resin | Description | |
|---|---|---|
| 1 | Mondur MR ® | wood moisture = 2.7 wt % |
| 2 | Acyl PF/Mondur MR ® | 40 wt %: 60 wt %; wood moisture = 2.7 wt % |
| 3 | Acyl PF/Mondur MR ® | 40 wt %: 60 wt %; wood moisture = 5.6 wt % |

Results of thickness swell and internal bond

| Resin (press time in minutes) | % Thickness Swell | Internal Bond (psi) |
|---|---|---|
| 1 (5.75) | 4.5 | 87 |
| 1 (5.50) | 5.5 | 69 |
| 1 (5.25) | 4.5 | 79 |
| 2 (5.75) | 5.6 | 73 |
| 2 (5.25) | 8.9 | 60 |
| 2 (5.00) | 8.4 | 67 |
| 3 (5.59) | 9.3 | 56 |
| 3 (5.25) | 11.0 | 61 |
| 3 (5.00) | 12.0 | 51 |

The results of the board study demonstrate that the resin of the invention is capable of producing a panel with acceptable thickness swell properties and internal bond strengths within press times that are commercially viable. One of the surprising features is that the same process used to provide greater room temperature stability in the hybrid resin appears to also offer faster cure speed in board production. The cure speed of the hybrid (mixed) resin appears to be faster than that of either component. Past experience with PF resoles indicates that they are always slower than pMDI in cure time. The acylated PF resins are even slower than ordinary PF resoles. Yet, when used in combination with pMDI, the result is a faster cure time. This attribute has great commercial advantage in reducing the dwell time in the consolidating press, thereby making the board making process more productive. This greatly improves the production for a fixed capital investment in press apparatus and related equipment.

While it will be apparent to those skilled in the art that various modifications and other embodiments of the invention can be made upon review of the foregoing disclosure, such modifications and embodiments do not depart from the spirit or scope of the invention as defined in the appended claims.

We claim:

1. A hybrid resin comprising a protected phenol-formaldehyde resin and a polymeric phenyl isocyanate, wherein said protected phenol-formaldehyde resin comprises an acylated phenol-formaldehyde.

2. The hybrid resin of claim 1, wherein the phenol-formaldehyde resin is a resole.

3. The hybrid resin of claim 1, wherein the phenyl isocyanate is 4-4' methylene bis(phenyl isocanate).

4. The hybrid resin of claim 1, wherein the ratio of the protected phenol formaldehyde to the polymeric phenyl isocyanate is an amount of from about 10% to about 80% by weight and 90% to about 20% of the polymeric phenyl isocyanate.

5. The hybrid resin of claim 4, wherein the ratio of the protected phenol formaldehyde to the polymeric phenyl isocyanate is from about 10 wt %–40 wt % phenol formaldehyde to about 60 wt %–90 wt % polymeric phenyl isocyanate.

6. The hybrid resin of claim 1, having a storage stability of at least two weeks at room temperature.

7. The hybrid resin of claim 1, wherein said protected phenol-formaldehyde resin comprises an acyl group formed from a group selected from the group consisting of ketene, diketene, formate, acrylate, propionate, lactate, crotonate, methacrylate, butyrate, isobutyrate, caproate, caprylate, benzoate, toluate, p-amino-benzoate, p-hydroxybenzoate, salicylate, cinnamate, laurate, myristate, palmitate, oleate, ricinoleate, stearate, oxalate, euccinate, fumarate, maleate, adipate, phthalate, azelate, and sebacate groups.

8. The hybrid resin of claim 1, wherein said protected phenol-formaldehyde resin comprises an acetate group.

9. A method of manufacturing board made of lignocellulosic particles comprising mixing said particles with a hybrid resin according to claim 1, forming the resulting mixture of lignocellulosic particles and resin into a loose mat and consolidating the mat under heat and pressure to deprotect the phenol-formaldehyde and cure the resin.

10. The process of claim 9, wherein the deprotection occurs in the presence of moisture carried by the lignocellulosic particles.

11. The process of claim 9, wherein the deprotection occurs by reason of moisture provided by steam.

12. The process of claim 9, wherein the deprotected phenol formaldehyde reacts with the NCO group of the polymeric phenyl isocyanate at room temperature in excess of 120° C.

13. The process of claim 9, wherein the cellulosic particles are selected from the group consisting of wood flakes, wood fibers, wood wafers, wood strips, wood strands, wood veneers and mixtures thereof.

14. A method of synthesizing a hybrid resin comprising providing a phenol formaldehyde resin, protecting the reactive oxygens of the phenol formaldehyde resin, mixing the protected phenol formaldehyde resin with a polymeric phenyl isocyanate having reactive NCO groups, deprotecting the reactive oxygens and permitting the reactive oxygens of the hydroxyl groups of the phenol formaldehyde to react with the NCO groups, thereby obtaining a hardened resin, wherein the protecting step results in an acylated phenol formaldehyde resin.

15. The method of claim 14, including mixing the hybrid resin with cellulosic material before the deprotecting step.

16. The method of claim 14, wherein the hybrid resin is mixed with particles before the deprotecting step.

17. The method of claim 14, wherein deprotecting is achieved under conditions of elevated heat, elevated pressure and in the presence of moisture.

18. The method of claim 14, including the step of storing the mixture for up to two weeks at room temperature before said deprotecting step.

19. The method of claim 14, wherein the mixing step comprises mixing 10 wt % to 80 wt % of the protected phenol formaldehyde with 90 wt % to 20 wt % of the polymeric phenyl isocyanate.

20. The method of claim 14, wherein the phenol-formaldehyde is a resole and the phenyl isocyanate is 4-4' methylene bis(phenyl isocyanate).

21. The method of claim 14, wherein the mixing comprises mixing 10 wt % to 40 wt % of the protected phenol formaldehyde with 90 wt % to 60 wt % of the polymeric phenyl isocyanate.

22. The method of claim 14, wherein said acylated phenol-formaldehyde comprises an acyl group formed from a group selected from the group consisting of ketene, diketene, formate, acrylate, propionate, lactate, crotonate, methacrylate, butyrate, isobutyrate, caproate, caprylate, benzoate, toluate, p-amino-benzoate, p-hydroxybenzoate, salicylate, cinnamate, laurate, myristate, palmitate, oleate, ricinoleate, stearate, oxalate, euccinate, fumarate, maleate, adipate, phthalate, azelate and sebacate groups.

23. The method of claim 14, wherein said protected phenol-formaldehyde resin comprises an acetate group.

24. A method comprising providing a phenol formaldehyde resin, protecting the reactive oxygens of the phenol formaldehyde resin to form an acylated phenol formaldehyde, and mixing the protected phenol formaldehyde resin with a polymeric phenyl isocyanate having reactive NCO groups.

25. A hybrid resin comprising an esterified phenol-formaldehyde resin protected from reacting with an isocyanate and a polymeric phenyl isocyanate.

26. A method of synthesizing a hybrid resin comprising providing a phenol formaldehyde resin, protecting the reactive oxygens of the phenol formaldehyde resin by esterification as to hinder reaction with an isocyanate, mixing the protected phenol formaldehyde resin with a polymeric phenyl isocyanate having reactive NCO groups, deprotecting the reactive oxygens under conditions of temperature and moisture to remove the ester group and permitting the reactive oxygens of the hydroxyl groups of the phenol formaldehyde to react with the NCO groups, thereby obtaining a hardened resin.

\* \* \* \* \*

UNITED STATES PATENT AND TRADEMARK OFFICE
CERTIFICATE OF CORRECTION

PATENT NO.    : 6,478,998 B1
DATED         : November 12, 2002
INVENTOR(S)   : Miller et al.

It is certified that error appears in the above-identified patent and that said Letters Patent is hereby corrected as shown below:

<u>Title page,</u>
Item [73], should read:
-- Borden Chemical, Inc., Columbus, OH (US) and Bayer Corporation, Pittsburgh, PA (US) --

Signed and Sealed this

Thirteenth Day of May, 2003

JAMES E. ROGAN
*Director of the United States Patent and Trademark Office*